Dec. 18, 1951 G. H. MILES 2,579,177

OPTICAL PROJECTION APPARATUS

Filed Nov. 15, 1945 2 SHEETS—SHEET 1

INVENTOR
George Herbert Miles

BY Dowell & Dowell

ATTORNEYS

OPTICAL PROJECTION APPARATUS

Filed Nov. 15, 1945 2 SHEETS—SHEET 2

INVENTOR
George Herbert Miles
BY Dowell & Dowell
ATTORNEYS

Patented Dec. 18, 1951 2,579,177

UNITED STATES PATENT OFFICE 2,579,177

OPTICAL PROJECTION APPARATUS

George Herbert Miles, Hillside, New Barnet, England

Application November 15, 1945, Serial No. 628,831
In Great Britain, August 23, 1943

2 Claims. (Cl. 88—1)

In the specification of my Patent No. 2,046,202 there is described a method of simulating or creating the impression of movement or travel through space over ground or among objects by a person who, though really stationary at a point of observation, is enabled by operative means to control the movement or course he is apparently taking.

As heretofore performed, the model scene or landscape has been moved in relation to a point of light adapted to illuminate objects of the scene and throw a shadowgraph image of the scene, or parts thereof, onto a screen. This method has imposed an undesirable limitation upon the effect that is visually obtainable, even though the base of the model and the source of the objects on it have been of transparent character through which rays have been free to pass to the screen. This applies, for example, with respect to roads and paths.

The present invention constitutes a modification of or an addition to apparatus of the kind described in my aforesaid patent which is designed to secure a more accurate presentation of landscapes or objects upon a topographical layout, giving contour, solidity, color and intimate details, instead of a mere silhouette or shadowgraph of these objects.

To this end the invention consists in illuminating a model scene as a whole, so that rays from the model are or will be received by the finder or so-called "entrance pupil" of an optical system situated at a height from the ground or base of the model scene which, relatively thereto, is equivalent to the height of the eyes of a person who would be viewing a natural corresponding landscape, the said rays from the model being transferred by means of the said optical system to the observer's eye through lenses or upon a suitable screen, and any movement between the so-called entrance pupil and the model scene relatively, one to the other, producing the illusion that the observer is moving over the ground along or amongst the objects of the scene.

Figure 5:
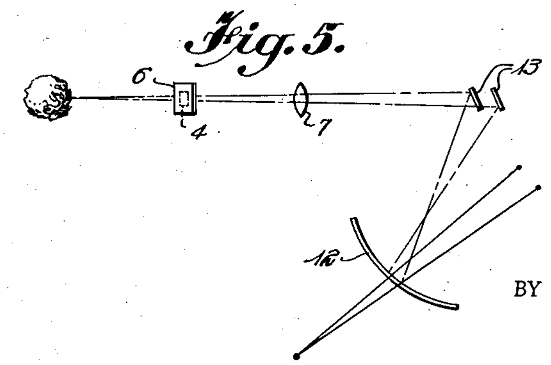
Figure 6:
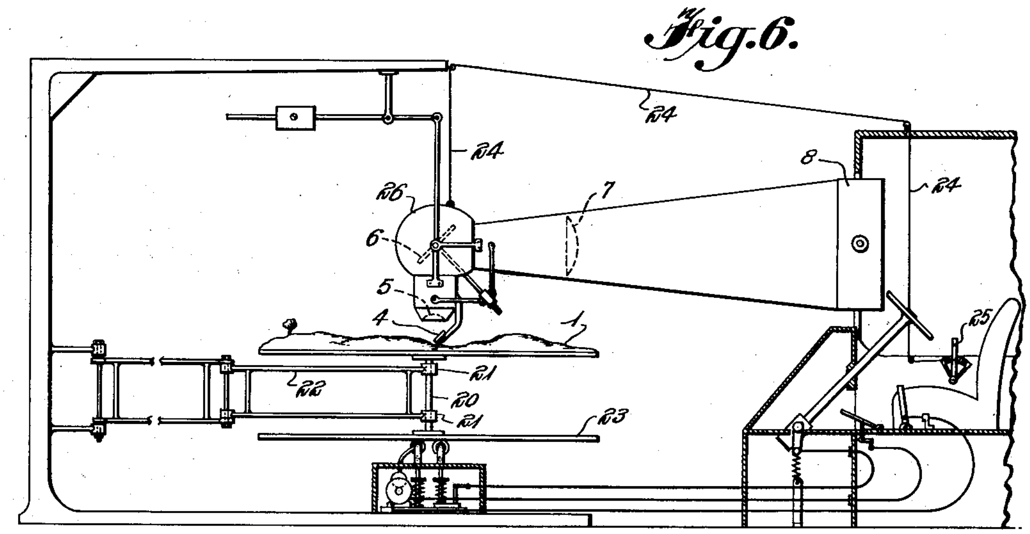
Figure 7:
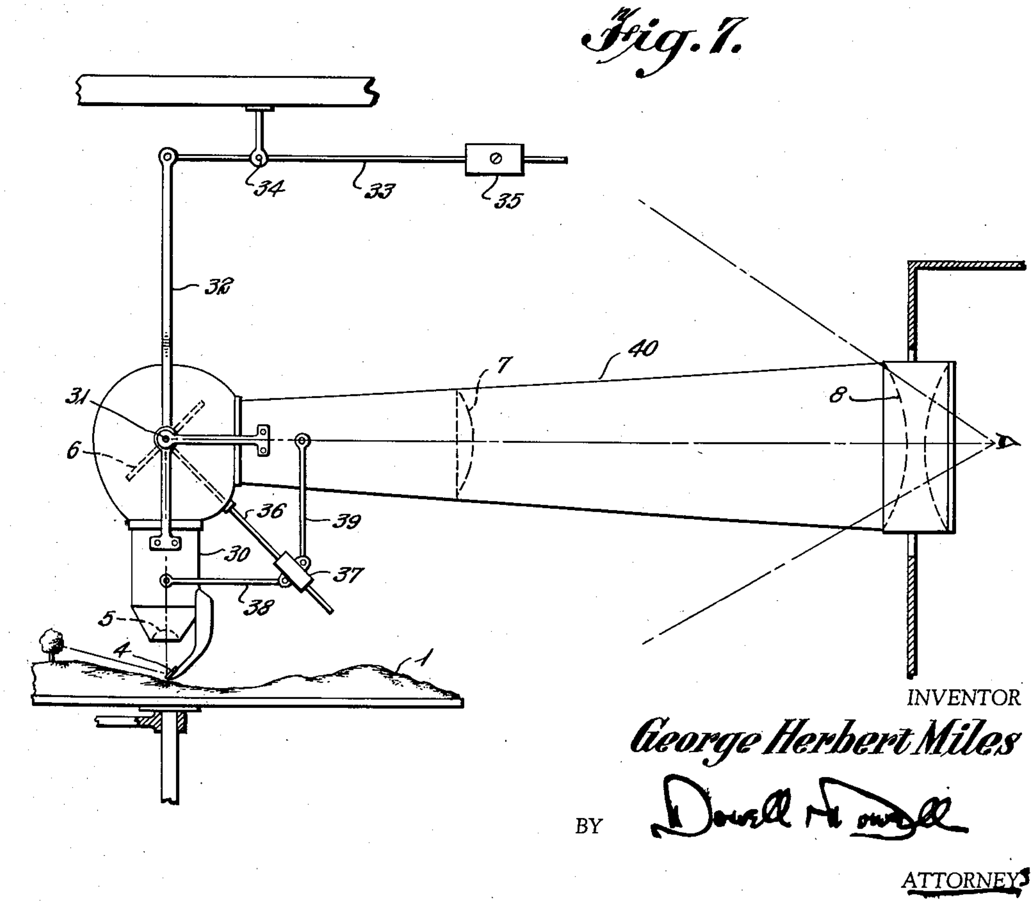

In the accompanying drawings, Figures 1 to 5 are diagrammatic views illustrative of proposed different ways of carrying out the invention, while Figures 6 and 7 are further diagrammatic but more detailed views in side elevation showing, respectively, means controllable from an observer's station for causing relative movement between the image pick-up and model scene, and means effectuating an articulation between image pick-up and image transmission tubes.

Figures 1, 2:
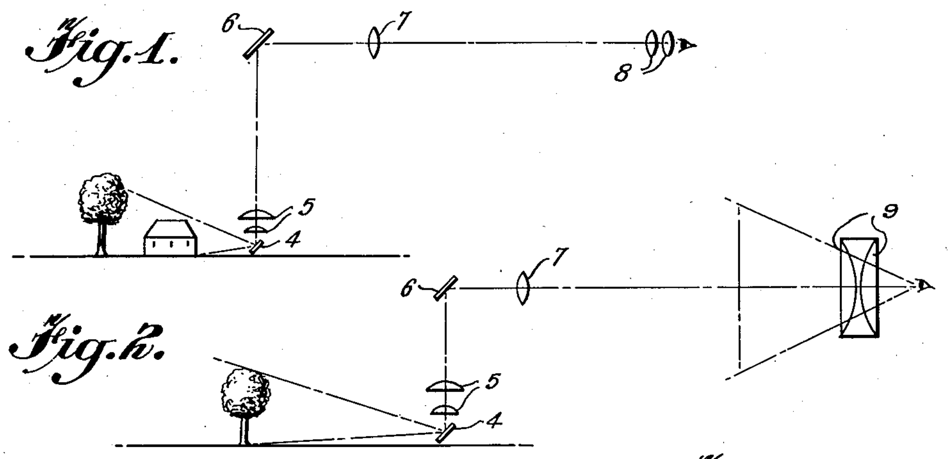

In Figures 1 and 2 for example, rays from the objects constituting the model scene (house, tree, road, etc.) when illuminated, are received by or through a finder (entrance pupil) or what may better be called a "pick-up," situated at or near the surface of the model scene as previously stated, which pick-up may consist of or include a mirror, lenses or equivalent means. This pick-up transmits rays from the objects picked up or "seen" to and through the optical system which in turn forms or reproduces an image of the object at any desired point or position convenient to the observer. In the examples here shown, 4 represents the pick-up in the form of a mirror and 5 represents lenses transmitting the rays therefrom to a reflecting mirror 6.

The image or view produced by these rays is transmitted to the observer by direct vision through lenses, or from a screen or alternatively by suitable mirrors, to which the scene is transmitted, placed in front of the observer. In Fig. 1 the rays transmitted to the mirror 6 are reflected therefrom or thereby to a lens 7, which in turn transmits them to an eye piece 8, which may be a binocular. In Fig. 2 the rays from the lens 7 pass through a single eye piece lens 9 so that both eyes can see through it. It is not necessary for the objects of the scene to be placed on a transparent ground or plate. A solid view is obtained, the realism of which is limited only by the accuracy and detail of the objects included in the model scene presented.

As the pick-up simulates or creates the impression on persons' eyes, the resultant image, which may be given unit or any desired magnification or direction by the optical transmission system adopted, gives the illusion of presence among and/or movement over ground towards or about and around the objects, as relative movement between the pick-up and the landscape occurs. These movements can be controlled by the observer in ways such as described in U. S. Letters Patent 2,046,202, or as shown in Fig. 6 hereof with various variations; or it can be done by incorporating the pick up mirror 4 and lenses 5 in a tube articulated to a tube containing the lenses 7 and 8, the mirror being located at the point of intersection of the axes of the two tubes and connected by linkage in known manner to both tubes, so that a line normal to the mirror 6 always bisects the angle between the tubes due to movement by the observer of one tube in relation to the other. Fig. 7 serves as an illustration of such an articulation arrangement.

Solid objects being viewed directly change in light, shade, and form. This, together with the effects of parallax and changing visual angles as objects approach or recede, give, as already stated, stereoscopic effects, which may be further enhanced by using dual and closely proximated pick-up points to simulate the pupils of the eyes and viewing the landscape through these by a separate optical system for each eye, as in binocular microscopes, or similar optical device.

Figures 3, 4:
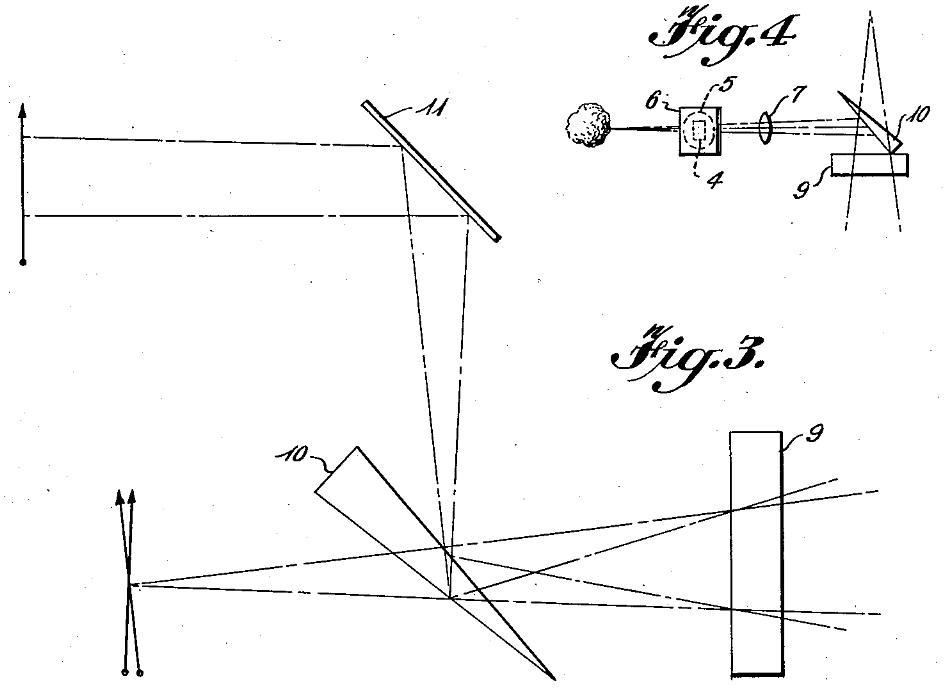

Alternatively and more simply, by the expedient of using larger aperture lenses followed by a large single eyepiece, such as that indicated at 9 in Figs. 3 and 4 having lenses of say 8-inch diameter or more, so that both eyes can see through it, a binocular and stereoscopic view can be obtained if a glasswedge 10 of the correct angle, silvered at the back and half silvered in front, is placed at some point in the path from the pickup to the eyes. The wedge 10 acts to reflect rays for the right eye from one surface while rays from the other surface reflects to the left eye. Separate images are thus received by each eye. This method has the advantage of giving more freedom of head movement to the observer than do normal small eyepieces.

Figs. 3 and 4 are plan views, unlike the elevational views of Figs. 1 and 2, and Fig. 3 differs from Fig. 4 only in that a mirror 11 receives the transmitted rays before the wedge 10 is reached, thereby altering the position at which the lens 9 is located.

Alternatively, again if the landscape is very brilliantly illuminated and the rays from the pick-up are passed through large-aperture wide-angle lenses to suitable projection lenses, an image can be thrown on a screen, and the view point can, by the aid of the pick-up, be brought to any desired point of the landscape (or, conversely, any desired part of the landscape can be brought into the view of the pick-up). In doing as just stated the person viewing the image on the screen obtains the illusion of movement say along a road, through a forest, or in a flight over the landscape. Other methods of enhancing the stereoscopic effect similarly to those already referred to may be employed. Again the required movements can be controlled by the observer as described in my U. S. Letters Patent 2,046,202 or as illustrated for example in Fig. 6 hereof.

The angle at which the pick-up is placed modifies the direction of the observer's view. By turning the mirror or pick-up to the right or left, or interposing suitably adjusted prisms for instance, the observer can look up, down, to the right, to the left, behind or in the same direction in which he is apparently travelling.

As a further alternative, and as shown in Fig. 5, a large concave mirror 12 may be used, instead of a screen, to receive and enlarge the image which is picked up. In this way, less light is required to illuminate the objects and the stereoscopic effect may be increased by application of any of the methods already outlined. As exemplified, the rays from the lens 7 are directed onto the mirror 12 by two mirror surfaces 13, one of them being silvered and the other half silvered, these expressions and their meaning being well known in the art. Fig. 6 illustrates diagrammatically an apparatus arrangement for effecting and controlling relative movement between the pick-up and the model scene 1 from the station of the observer. In this instance the pick-up moves only in a vertical plane, while the model scene moves in a horizontal plane and also rotates; however, by a simple variation or modification of mechanism the pick-up can be caused to move in both vertical and horizontal planes and also to rotate or turn in any direction, while the model scene is made or kept stationary. No particular mechanism for attainment of such movements or relative movements is here claimed because of the innumerable ways in which it can be done, but all movements would be made to be contorlled by levers or turn dials at the observer's station. The principal purpose is to enable the observer to direct his simulated travel in the direction or directions desired over the landscape of the model scene.

In Fig. 6, the model scene 1 is mounted for rotation on spindle 20 in bearings 21 on horizontally movable articulated frame 22, spindle 20 being rotatable by disk 23. The pick-up mirror 4 is moved in a vertical direction only by means of a cord of the like 24 which is pulled by movement of a lever 25 at one end, the other end of cord 24 being fixedly connected to the housing 26 which supports mirror 4.

In Fig. 6 also an articulation arrangement between the image pick-up and transmission to the observer is shown as described hereinabove. Fig. 7, however, illustrates a little more clearly how the pick-up and transmission elements may be placed in an articulated tube arrangement and relationship. In this respect, again, no particular arrangement or form of articulating mechanism is claimed.

In Fig. 7 the tube 30 carries at its lower end the lens 5 and pick-up mirror 4. Tube 30 carries a spindle 31 to which is attached a suspension rod 32 linked to lever 33 rocking on fulcrum 34 and carrying a counterbalancing weight 35 permitting mirror 4 to ride over vertical irregularities of the model scene 1. Attached to spindle 31 is a rod 36 sliding through tube 37 connected by links 38, 39 to tube 30 and to the image transmitting tube 40, to maintain the rod 36 normal to the mirror 6, so that rays from mirror 4 will be reflected along the axis of transmitting tube 40.

Having thus described the elementary or basic features of improvement of this invention, what I claim as new is:

1. An optical projection apparatus for giving the impression of personal movement within an environment to an observer actually stationary relative thereto, comprising, in combination, a small scale model scene produced in topographical area layout form with various true-to-life object representations incorporated therein; means throwing light upon said model scene; an image pick-up light-deflecting means arranged in operative relation to the model scene at a scale height respective thereto corresponding normally to the height of the eyes of a person viewing the actual or natural scene represented by the model at the point of said image pick-up light-deflecting means, the said last-named means being adapted to be moved relatively to the model scene within the area of such model scene; a fixed viewing station for the observer outside the model scene area for viewing the scene normally at the height of the observer; means for operatively moving the image pick-up light-deflecting means relatively to the model scene within the area thereof with respect to the various scenic object representations incorporated therein; and an optical system including reflector means correlated cooperatively with the image pick-up light-deflecting means and the viewing station adapted to transmit to the eyes of the observer at said viewing station the image picked up by said image pick-up light-deflecting means as the latter is moved as desired within the model scene area, so as to give the observer a continuous and changeable view of the model scene at and from any point or position throughout its extent such as he would obtain by or in actual travel movement in any direction within the area represented by the model.

2. An optical projection apparatus for giving the impression of personal movement within an environment to an observer actually stationary relative thereto, comprising, in combination, a small scale model scene produced in topographical area layout form with various true-to-life object representations such as trees, roads, buildings and the like incorporated therein; means for illuminating said model scene; a light-deflecting image pick-up means arranged in operative relation to the model scene at a scale height respective thereto corresponding normally to the height of the eyes of a person were he viewing at the point of the light-deflecting image pick-up means the actual or natural scene represented by the model, said light-deflecting image pick-up means being adapted to be moved relatively to the model scene in any direction within the area of such model scene; a fixed viewing station for the observer outside the model scene area for viewing the scene normally at the height of the eyes of the observer; means controllable at and from the fixed viewing station for operatively moving the light-deflecting image pick-up means relatively to the model scene within the area thereof toward, away from, along or around the various scenic object representations incorporated therein, this last-named means being operable and controllable by manipulation of the observer at said viewing station at his will; and an optical system including reflector means correlated cooperatively with the light-deflecting image pick-up means and the viewing station adapted to transmit to the eyes of the observer at said viewing station the image picked up by said light deflecting image pick-up means as the latter is moved as desired within the model scene area, so as to give the observer a continuous and changeable view of the model scene at and from any point or position throughout its extent such as he would obtain by or in actual travel movement in any direction within the area represented by the model.

GEORGE HERBERT MILES.

REFERENCES CITED

The following references are of record in the file of this patent:

UNITED STATES PATENTS

| Number | Name | Date |
|---|---|---|
| 148,825 | Howard | Mar. 24, 1874 |
| 1,190,619 | Armbruster | July 11, 1916 |
| 1,481,006 | Hammond | Jan. 15, 1924 |
| 1,528,506 | Opaci | Mar. 3, 1925 |
| 1,871,807 | Schwabe | Aug. 16, 1932 |
| 1,919,561 | Kogel | July 25, 1933 |
| 2,046,202 | Miles | June 30, 1936 |
| 2,084,795 | Donle | June 22, 1937 |
| 2,106,752 | Land | Feb. 1, 1938 |
| 2,321,894 | Bischoff | June 15, 1943 |
| 2,324,632 | Maurer | July 20, 1943 |
| 2,381,757 | Jones | Aug. 7, 1945 |
| 2,392,781 | Simjian | Jan. 8, 1946 |
| 2,413,633 | Jones | Dec. 31, 1946 |

FOREIGN PATENTS

| Number | Country | Date |
|---|---|---|
| 101,604 | Austria | of 1925 |
| 461,153 | Germany | of 1928 |
| 498,081 | Germany | of 1930 |